United States Patent
Mu

(10) Patent No.: US 11,733,395 B2
(45) Date of Patent: Aug. 22, 2023

(54) PRECISE POINT POSITION AND REAL-TIME KINEMATIC (PPP-RTK) POSITIONING METHOD AND DEVICE

(71) Applicant: Beijing Future Navigation Technology Co., Ltd, Beijing (CN)

(72) Inventor: Xucheng Mu, Beijing (CN)

(73) Assignee: Beijing Future Navigation Technology Co., Ltd, Beijing (CN)

( * ) Notice: Subject to any disclaimer, the term of this patent is extended or adjusted under 35 U.S.C. 154(b) by 322 days.

(21) Appl. No.: 15/734,341

(22) PCT Filed: Nov. 20, 2018

(86) PCT No.: PCT/CN2018/116294
§ 371 (c)(1),
(2) Date: Dec. 2, 2020

(87) PCT Pub. No.: WO2019/233039
PCT Pub. Date: Dec. 12, 2019

(65) Prior Publication Data
US 2021/0223406 A1   Jul. 22, 2021

(30) Foreign Application Priority Data

Jun. 4, 2018   (CN) .......................... 201810564952.4

(51) Int. Cl.
*G01S 19/44* (2010.01)
*G01S 19/37* (2010.01)
*G01S 19/23* (2010.01)

(52) U.S. Cl.
CPC .............. *G01S 19/44* (2013.01); *G01S 19/23* (2013.01); *G01S 19/37* (2013.01)

(58) Field of Classification Search
CPC ........... G01S 19/44; G01S 19/23; G01S 19/37
(Continued)

(56) References Cited

U.S. PATENT DOCUMENTS 6,373,432 B1   4/2002   Rabinowitz
6,480,788 B2   11/2002   Kilfeather
(Continued)

FOREIGN PATENT DOCUMENTS

CN   103176188 A   6/2013
CN   103344978 A   10/2013
(Continued)

OTHER PUBLICATIONS

International Search Report dated Mar. 12, 2019 for Parent PCT Appl. No. PCT/CN2018/116294.
(Continued)

*Primary Examiner* — Harry K Liu
(74) *Attorney, Agent, or Firm* — James E. Walton

(57) ABSTRACT

A precise point position and real-time kinematic (PPP-RTK) positioning method, including: when direct emission signals broadcast by a multi-system navigation satellite and a low-earth-orbit constellation are detected, determining raw observation data (S11); receiving navigation satellite augmentation information broadcast by the low-earth-orbit constellation, and a low-earth-orbit satellite precise orbit and precise clock difference (S12); using the navigation satellite augmentation information, the low-earth-orbit satellite precise orbit and precise clock difference and the raw observation data for precise point positioning (S13); or when comprehensive ground-based augmentation error correction information is received, using the navigation satellite augmentation information, the low-earth-orbit satellite precise orbit and precise clock difference, the raw observation data and the comprehensive ground-based augmentation error correction information for precise point positioning of ground-based augmentation (S13'). The present application further relates to a precise point position and real-time
(Continued)

kinematic (PPP-RTK) positioning device, a computer-readable storage medium and a processor.

19 Claims, 3 Drawing Sheets

(58) Field of Classification Search
USPC .................................................. 342/357.77
See application file for complete search history.

(56) References Cited

U.S. PATENT DOCUMENTS

| | | | |
|---|---|---|---|
| 6,560,536 | B1 | 5/2003 | Sullivan |
| 6,725,158 | B1 | 4/2004 | Sullivan |
| 7,583,225 | B2 | 9/2009 | Cohen |
| 7,969,352 | B2 | 6/2011 | DiLellio |
| 8,260,551 | B2 | 9/2012 | Janky |
| 8,515,670 | B2 | 8/2013 | Janky |
| 8,630,796 | B2 | 1/2014 | Sullivan |
| 9,121,932 | B2 | 9/2015 | Janky |
| 10,962,651 | B2 | 3/2021 | Liu |
| 11,513,232 | B2 | 11/2022 | Reid |
| 2004/0143392 | A1 | 7/2004 | Kilfeather |
| 2009/0174597 | A1 | 7/2009 | DiLellio |
| 2021/0208286 | A1 | 7/2021 | Turpin |
| 2021/0239855 | A1 | 8/2021 | Mu |

FOREIGN PATENT DOCUMENTS

| | | |
|---|---|---|
| CN | 106443739 A | 2/2017 |
| CN | 106646564 A | 5/2017 |
| CN | 107153209 A | 9/2017 |
| CN | 107229061 A | 10/2017 |
| CN | 197561568 A | 1/2018 |
| CN | 108415050 A | 8/2018 |
| WO | 02060195 A1 | 8/2002 |
| WO | WO-2015065541 A1 * | 5/2015 ............ G01S 19/04 |
| WO | WO-2015131064 A1 * | 9/2015 ............ G01S 19/07 |
| WO | 2018009088 A1 | 1/2018 |

OTHER PUBLICATIONS

Preliminary Amendment dated Dec. 2, 2020 from U.S. Appl. No. 15/734,446.
International Search Report dated Mar. 4, 2019 from PCT Application No. PCT/CN2018/117070.
Zhao, Yi et al. "PPP Augmentation and Real-Time Precise Orbit Determination for LEO Satellites" Proceedings of the 36th Chinese Control Conference, Jul. 28, 2047, pp. 5937-5941.
Ke, Mingxing et al. "Integrating GPS and LEO to Accelerate Convergence Time of Precise Point Positioning" 2015 International Conference on Wireless Communications & Signal Processing (WCSP), Oct. 17, 2015, pp. 1-5.
Office Action dated Jun. 8, 2022 from U.S. Appl. No. 15/734,446.
Amendment dated Aug. 19, 2022 from U.S. Appl. No. 15/734,446.
Final Office Action dated Nov. 25, 2022 from U.S. Appl. No. 15/734,446.
Amendment After Final dated Jan. 23, 2023 from U.S, U.S. Appl. No. 15/734,446.
Advisory Action dated Feb. 13, 2023 from U.S. Appl. No. 15/734,446.
Request for Continued Examination and Amendment Under 37 C.F.R. § 1.114 dated Feb. 27, 2023 from U.S. Appl. No. 15/734,446.
Notice of Allowance dated Mar. 29, 2023 from U.S. Appl. No. 15/734,446.
Preliminary Amendment dated Dec. 3, 2020 from U.S. Appl. No. 15/734,726.
International Search Report dated Feb. 27, 2019 from PCT Application No. PCT/CN2018/117071.
Zhang, Peihua et al., "iGPS Exploration and Analysis of iGPS Navigation Technology" Modern Navigation, No. 2, Apr. 30, 2018, ISSN: 1674-797, pp. 88-91 and 93.
Zhang, Peihua et al., "The Research of Enhancing Orbit Determination with Satellite-Based Observations in Three Station Layouts," Journal of Geomatics Science and Technology, vol. 34, No. 5, Oct. 31, 2017, ISSN: 1673-6338, pp. 445, 446, and 449.

* cited by examiner

PRECISE POINT POSITION AND REAL-TIME KINEMATIC (PPP-RTK) POSITIONING METHOD AND DEVICE

CROSS REFERENCE TO RELATED APPLICATION

The present application claims the priority of a Chinese patent application filed with the Chinese Patent Office with an application number of 201810564952.4 on Jun. 4, 2018, the entire contents of which are incorporated into the present application by reference.

TECHNICAL FIELD

The present application relates to satellite navigation technology, and for example relates to a positioning method and device of Precise Point Positioning-Real Time Kinematic (PPP-RTK).

BACKGROUND

The requirement for a relatively long time (more than 30 minutes) for initialization and reinitialization after interruption for Precise Point Positioning (PPP) of a navigation satellite is a main factor that limits the application of this technology in the field of fast and real-time dynamic high-precision. In order to shorten the time for initialization and improve the positioning accuracy, in recent years, the integer ambiguity fixation technology has been proposed and developed, in which a satellite fractional phase bias correction is resolved and published in real time by the global monitoring network, and the integer characteristics of the undifferenced ambiguity is restored by a user by applying a bias correction number, so as to perform the integer ambiguity fixation by using the relevant mature technologies. Studies have shown that the time for initialization of the PPP can be shortened to about 20 minutes by using the integer ambiguity fixation solution technology.

In order to reduce the influence of atmospheric delay error on initialization, some scholars have also proposed a PPP positioning method that takes into account atmospheric delay constraints. If the delay amount generated by the ionospheric model is used as observation constraint information to improve the solution performance, the time for initialization can further be shortened to 15 minutes. However it is still difficult to meet high-precision real-time positioning requirements. In order to reduce the convergence time, currently the corresponding errors at the mobile stations are corrected mainly in such a way that undifferenced comprehensive correction information is broadcasted by a ground-based augmentation system, so as to achieve a rapid separation of the ambiguity parameter and the position parameter, which can fix the ambiguity parameter within a few epochs, but has a high requirement for station density of the ground-based monitoring network, and thus is often suitable for low dynamic users.

SUMMARY OF THE INVENTION

The present application proposes a positioning method and device of Precise Point Positioning-Real Time Kinematic (PPP-RTK), in which the fast-moving characteristics of Low Earth Orbit (LEO) satellites is used to broadcast navigation signals, and in the meantime multiple systems are used to increase the number of navigation satellite observations, thereby comprehensively improving geometric configurations of user observation space, and in a region with a ground-based augmentation monitoring system, user observation errors are corrected by using regional comprehensive error information, thereby reducing the time for initialization of precise positioning for users and realizing the seamless switching of the PPP and real time dynamic (Real-Time Kinematic, RTK) services based on the LEO constellation navigation augmentation system through the unified model.

A PPP-RTK positioning method based on a LEO constellation navigation augmentation system provided by the present application includes a step S11, a step S12 and a step S13 (or a step S13').

In the step S11, original observation data is determined when a direct signal broadcasted by a multi-system navigation satellite and a LEO constellation is detected.

In the step S12, navigation satellite augmentation information broadcasted by the LEO constellation, as well as a LEO satellite precision orbit and a precision clock bias are received.

In the step S13, Precise Point Positioning is performed by using the navigation satellite augmentation information, the LEO satellite precision orbit and the precision clock bias, and the original observation data.

In the step S13', when the ground based augmentation comprehensive error correction information is received, ground based augmented Precise Point Positioning is performed by using the navigation satellite augmentation information, the LEO satellite precision orbit and the precision clock bias, the original observation data and ground based augmentation comprehensive error correction information.

In an embodiment, original observation data is determined when a direct signal broadcasted by a multi-system navigation satellite and a LEO constellation is detected includes: the direct signal and determining time length for tracking is tracked when the direct signal broadcasted by the multi-system navigation satellite and the LEO constellation is detected; the direct signal to determine the original observation data when the time length for tracking is larger than a preset time length is measured.

In an embodiment, the navigation satellite comprises at least one of the following: US Global Positioning System (GPS), China Beidou, EU Galileo, and Russian Global Navigation Satellite System (GLONASS).

In an embodiment, the navigation satellite augmentation information includes at least one of the following: a navigation satellite precision orbit and clock bias, a navigation satellite fractional phase bias correction, a LEO satellite fractional phase bias correction, and ionospheric model parameter information.

In an embodiment, the original observation data comprises at least one of the following: navigation satellite and LEO satellite pseudo-range observation data, navigation satellite and LEO satellite carrier phase observation data, and navigation satellite and LEO satellite Doppler observation data.

In an embodiment, a processing mode for the Precise Point Positioning comprises at least one of the following: a LEO satellite augmented ambiguity-float solution mode and a LEO satellite augmented ambiguity-fixed solution mode.

In an embodiment, the ground based augmentation comprehensive error correction information comprises at least one of the following: an undifferenced pseudo-range observation comprehensive error and an undifferenced carrier phase observation comprehensive error.

An embodiment of the present application provides an electronic device, including:
at least one processor; and
a memory in communication with the at least one processor;
wherein in the memory, instructions executable by the at least one processor are stored, which execute the method described in any one of the above when the instructions are executed by the at least one processor.

An embodiment of the present application provides a non-volatile computer readable storage medium, wherein the storage medium includes a program stored therein, which when running executes the method of Precise Point Positioning-Real Time Kinematic described in any one of the above when the program is running.

An embodiment of the present application provides a processor, which is configured to run a program, wherein the program is configured to executes the method of Precise Point Positioning-Real Time Kinematic described in any one of the above on the processor.

In the PPP-RTK positioning method based on the LEO constellation navigation augmentation system provided by the present application, seamless switching can be performed between a region with a ground-based augmentation monitoring system and the rest regions of the world, and resolution is performed by using a unified Precise Point Positioning mode. A real-time initialization, even a single-epoch initialization, is realized in the region with the ground-based augmentation monitoring system, with a positioning accuracy in the order of centimeter, and a near real-time initialization is realized in the rest regions of the world, with a positioning accuracy in the order of decimeter, even in the order of centimeter.

In the PPP-RTK positioning method based on the LEO constellation navigation augmentation system provided by the present application, near real-time precise positioning, velocity measurement and timing results can be obtained globally, real-time positioning, velocity measurement and timing results in the order of centimeter can be obtained in the ground-based augmented region, and seamless switching can be performed between the ground-based-augmented region and the rest non-ground-based-augmented region of the world.

BRIEF DESCRIPTION OF THE DRAWINGS

By reading the detailed description of the preferred embodiments below, various other advantages and benefits will become clear to those ordinary skills in the art. The attached drawings are only for the purpose of illustrating the preferred embodiments, and are not considered to be restrictions of the present application. And throughout the drawings, the same reference symbols are used to denote the same parts. In the drawings.

Figure 1:
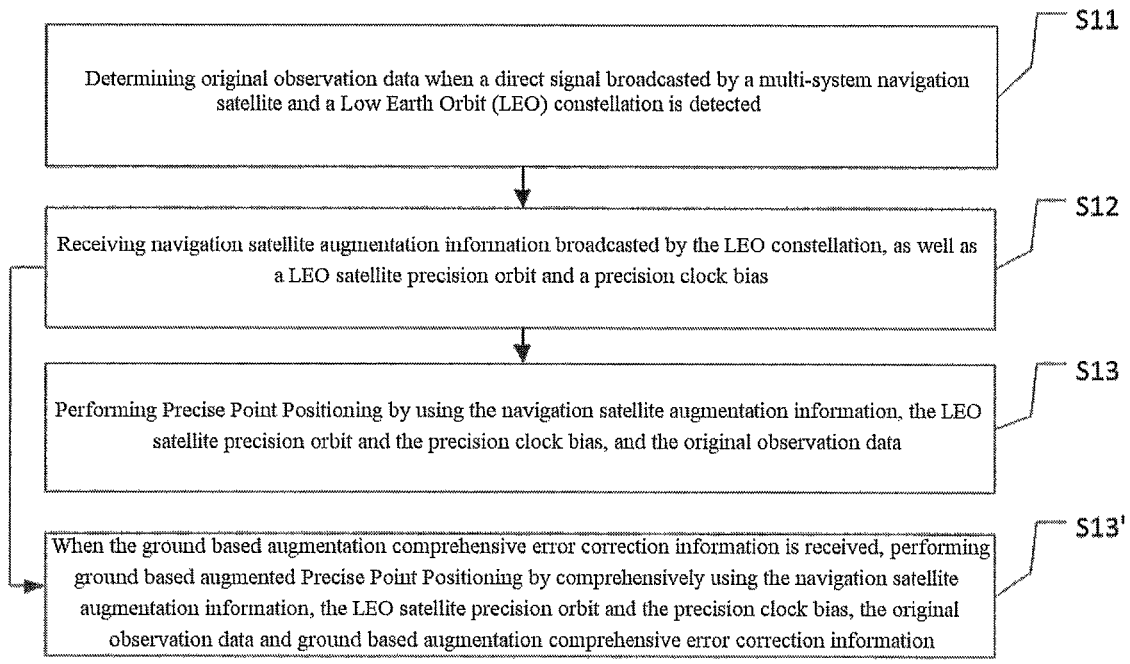
FIG. 1 shows a method flowchart of a PPP-RTK positioning method based on a LEO constellation navigation augmentation system of an embodiment of the present application.

DESCRIPTION OF SYMBOLS FOR MAIN COMPONENTS 100 navigation constellation
101 Beidou navigation satellite
102 GPS navigation satellite
103 GLONASS navigation satellite
104 Other navigation system satellites
110 LEO augmentation constellation
111 LEO satellite
120 Navigation signals, including navigation satellite navigation signal and LEO satellite navigation signal.
130 Global regions
131 Navigation apparatus using a PPP-RTK positioning method based on LEO constellation navigation augmentation system
140 ground-based augmented region
141 ground-based augmentation monitoring station
142 ground-based augmentation information broadcasting device

DETAILED DESCRIPTION OF THE PREFERRED EMBODIMENT

Hereinafter, exemplary embodiments of the present application will be described in more detail with reference to the accompanying drawings. Although the drawings show exemplary embodiments of the present disclosure, it should be understood that the present application can be implemented in various forms and should not be limited by the embodiments set forth herein. On the contrary, these embodiments are provided to enable a more thorough understanding of the present disclosure and to fully convey the scope of the present application to those skilled in the art.

FIG. 1 shows a method flowchart of a PPP-RTK positioning method based on a LEO constellation navigation augmentation system of an embodiment of the present application. With reference to FIG. 1, the PPP-RTK positioning method based on a LEO constellation navigation augmentation system provided by an embodiment of the present application includes step S11, step S12 and step S13 (or a step S13') as follows.

In the step S11, original observation data is determined when a direct signal broadcasted by a multi-system navigation satellite and a LEO constellation is detected.

In the step S12, navigation satellite augmentation information broadcasted by the LEO constellation, as well as a LEO satellite precision orbit and a precision clock bias are received.

In the step S13, Precise Point Positioning is performed by using the navigation satellite augmentation information, the LEO satellite precision orbit and the precision clock bias, and the original observation data.

In the step S13', when the ground based augmentation comprehensive error correction information is received, ground based augmented Precise Point Positioning is performed by using the navigation satellite augmentation information, the LEO satellite precision orbit and the precision clock bias, the original observation data and ground based augmentation comprehensive error correction information.

In the PPP-RTK positioning method disclosed by the embodiment of the present application, the fast-moving characteristics of LEO satellites is used to broadcast navigation signals, and in the meantime multiple systems are used to increase the number of navigation satellite observations, so that geometric configurations of user observation space are comprehensively improved, and near real-time initialization can be realized globally.

In an embodiment, in a region with a ground-based augmentation monitoring network, the station density of the ground augmentation monitoring network is effectively reduced by this method, and by correcting the user observation errors by receiving comprehensive error information of the ionosphere, troposphere and the like in the current region, real-time initialization can be realized with a unified PPP calculation and processing mode.

Figure 2:
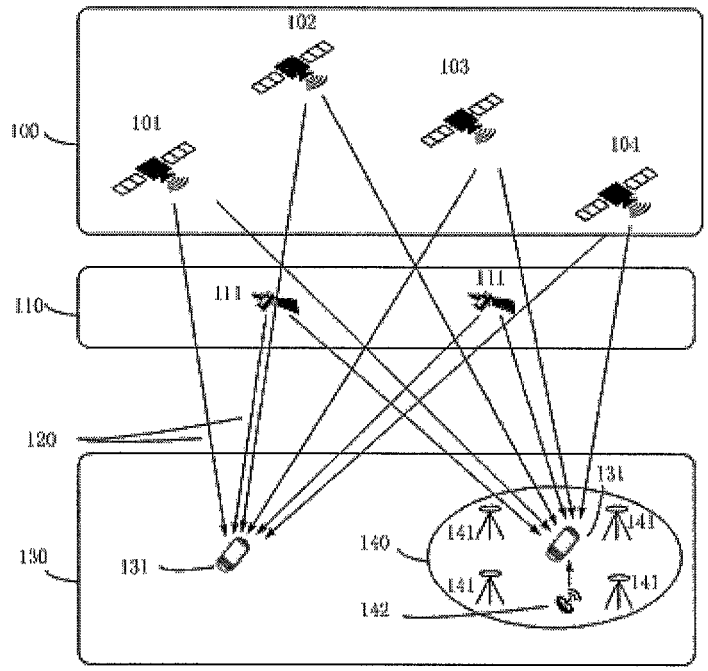
FIG. 2 shows a schematic diagram of realization principle of the PPP-RTK positioning method based on the LEO constellation navigation augmentation system of an embodiment of the present application.
Figure 3:
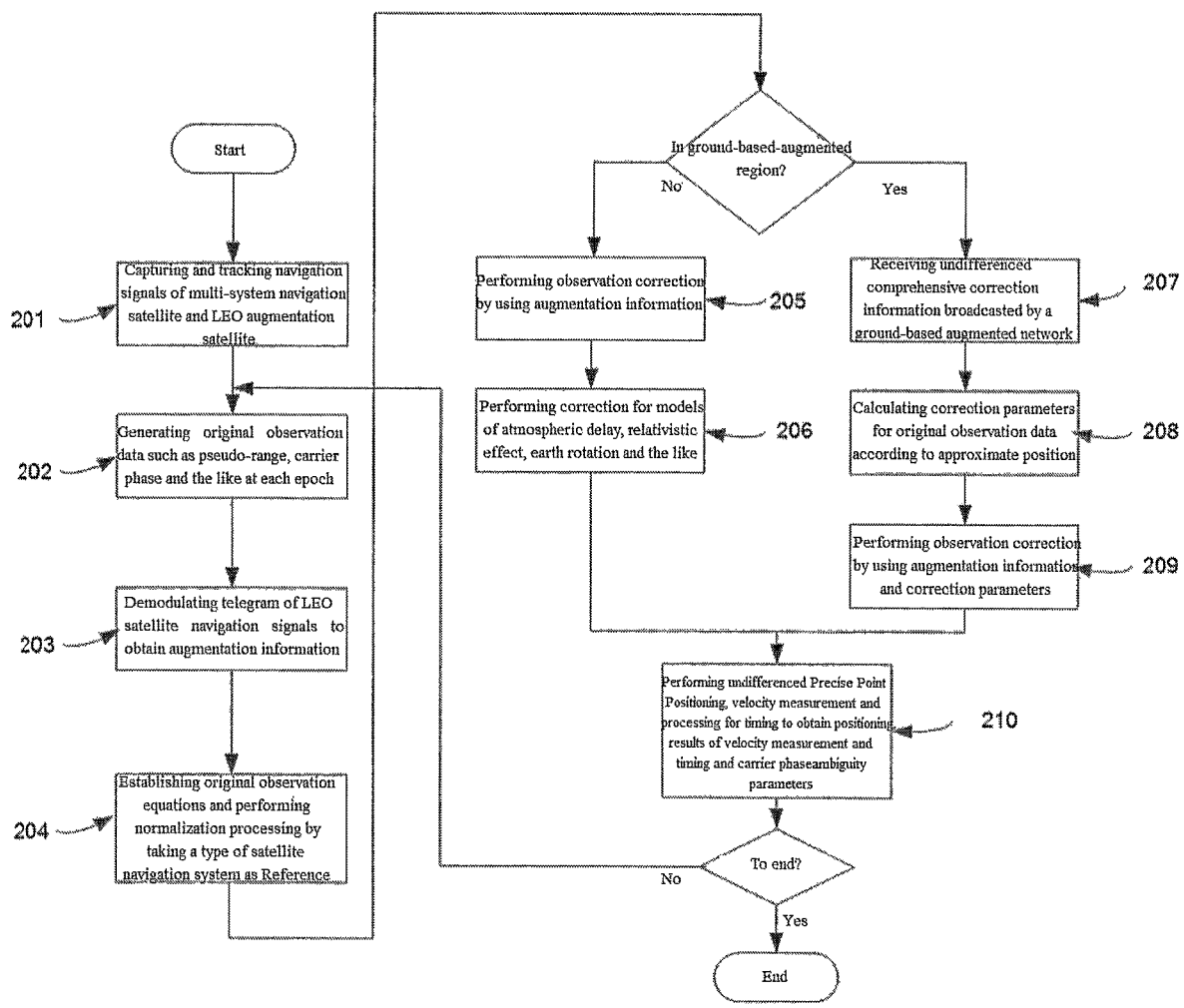
FIG. 3 shows a specific method flowchart of a PPP-RTK positioning based on a LEO constellation navigation augmentation system of another embodiment of the present application.

FIG. 2 shows a schematic diagram of realization principle of the PPP-RTK positioning method of an embodiment of the present application. The processing procedure thereof is as shown in FIG. 3, which includes: step 201-step 210.

In the step 201, navigation direct signals broadcasted by the multi-system navigation satellite and the LEO constellation are received and the direct signals are captured and tracked.

In the step 202, the navigation direct signals are measured at each epoch, to generate pseudo-range, carrier phase and Doppler observation data.

In the step 203, under the premise of stable signal tracking, telegram parameters of the LEO satellite direct signals are demodulated and navigation satellite augmentation information and LEO satellite precision orbit and clock bias are acquired, wherein the navigation satellite augmentation information includes navigation satellite precision orbit, clock bias, fractional phase bias, and global ionospheric model parameters.

That is, determining original observation data when a direct signal broadcasted by the multi-system navigation satellite and the LEO constellation is detected includes: tracking the direct signal and determining time length for tracking when the direct signal broadcasted by the multi-system navigation satellite and the LEO constellation is detected; measuring the direct signal to determine the original observation data when the time length for tracking is larger than a preset time length.

In the step 204, observation equations is established by using the original observation data, and by taking one kind of satellite navigation system as reference, normalization processing is performed on observation data from other satellite navigation systems and LEO satellites, to obtain observation equations with unified time reference.

In the step 206, if in a non-ground-based-augmented region, observation is corrected by using the navigation satellite augmentation information and the LEO satellite precision orbit and the clock bias In the step 207, if in a ground-based augmented region, undifferenced comprehensive correction information broadcasted by a ground-based monitoring network is received through a communication link.

In the step 208, error correction parameters of an approximate position of the use relative to each navigation satellite and LEO satellite are calculated according to the received undifferenced comprehensive correction information.

In the step 209, observation data are corrected by using the navigation satellite augmentation information and the LEO satellite precision orbit and the clock bias, and the above calculated error correction parameters.

In the step 210, positioning processing is performed by using a Precise Point Positioning mode, to obtain PPP-RTK positioning, timing and velocity measurement results and carrier phase ambiguity parameters and the like based on the LEO constellation navigation augmentation system.

In the PPP-RTK positioning method provided by the present application, the fast-moving characteristics of LEO satellites is used to broadcast navigation signals, and in the meantime multiple systems are used to increase the number of navigation satellite observations, so that geometric configurations of user observation space are comprehensively improved, and near real-time precise positioning, velocity measurement and timing results can be obtained globally, real-time positioning in the order of centimeter, velocity measurement and timing results can be obtained in the ground-based augmented region, and seamless switching can be performed between the ground-based-augmented region and the rest non-ground-based-augmented region of the world.

The technical solution of the present application will be described in detail below through a specific embodiment.

The main procedure of a rapid PPP processing in the global region based on the LEO constellation navigation augmentation system is as follows.

(1) Establishing Observation Equations by Using Original Observation Data

The original observation data generated from the navigation signals received by a receiver include pseudo-range, carrier phase and Doppler observation data of multiple constellations and multiple frequency points, wherein the observation equations for the pseudo-range and the carrier phase can be denoted as follows:

$$P_{i,r}^{G,S} = \rho_r^{G,S} + cdt_r - cdt^{G,S} + dTrop_r^{G,S} + \frac{f_1^2}{f_i^2} dIon_r^{G,S} + b_{i,r} - b_i^{G,S} + \varepsilon_{i,r}^{G,S} \quad (1)$$

$$L_{i,r}^{G,S} = \rho_r^{G,S} + cdt_r - cdt^{G,S} + dTrop_r^{G,S} - \quad (2)$$
$$\frac{f_1^2}{f_i^2} dIon_r^{G,S} + \lambda_i N_{i,r}^{G,S} + h_{i,r} + \delta\phi_{i,r} - h_i^{G,S} - \delta\phi_i^{G,S} + \delta_{i,r}^{G,S}$$

in which,
G: denotes the satellite navigation system and the LEO augmentation system;
i: denotes signal frequency identification, i=1, 2, 3;
r, S: respectively denotes receiver and satellite identification;
$P_{i,r}^{G,S}$, $L_{i,r}^{G,S}$: respectively denotes pseudo-range and carrier phase observation values in meters;
$\rho_r^{G,S}$: is the geometric distance from the satellite to the receiver;
$dt_r$, $dt^{G,S}$: respectively are clock biases of the receiver and the satellite;
$dTrop_r^{G,S}$: is the tropospheric delay;
$dIon_r^{G,S}$: is the ionospheric delay on frequency 1;
$b_{i,r}$, $b_i^{G,S}$: respectively are pseudo-range hardware channel delays of the receiver and the satellite;
$N_{i,r}^{G,S}$: is the integer ambiguity;
$h_{i,r}$, $\delta\phi_{i,r}$: respectively are the carrier phase channel delay and the initial phase deviation of the receiver;
$h_i^{G,S}$, $\delta\phi_i^{G,S}$: respectively are the carrier phase channel delay and the initial phase deviation of the satellite;
$\varepsilon_{i,r}^{G,S}$, $\delta_{i,r}^{G,S}$: respectively are the unmodeled residual errors in the pseudo-range and carrier phase observations.

Because the carrier phase channel delay and the initial phase deviation cannot be separated, these two are usually combined and referred to as uncalibrated hardware delay, and at the sides of the receiver and the satellite, are respectively denoted as:

$$B_{i,r} = h_{i,r} + \delta\phi_{i,r} \quad (3)$$

$$B_i^{G,S} = h_i^{G,S} + \delta\phi_i^{G,S} \quad (4)$$

And the observation equation for the carrier phase can be denoted as:

$$L_{i,r}^{G,S} = \rho_r^{G,S} + cdt_r - cdt^{G,S} + dTrop_r^{G,S} - \frac{f_1^2}{f_i^2} dIon_r^{G,S} + \lambda_i N_{i,r}^{G,S} + B_{i,r} - B_i^{G,S} + \delta_{i,r}^{G,S} \quad (5)$$

(2) Constructing Observation Value of Ionosphere-Free Combination

Ionosphere-free combination observations are constructed by using dual frequency observation data, to eliminate the influence of the ionospheric delay of the first order and reduce unknown parameters, and the specific combined model is:

$$P_{3,r}^{G,S} = \frac{f_1^2 P_{1,r}^{G,S}}{f_1^2 - f_2^2} - \frac{f_2^2 P_{2,r}^{G,S}}{f_1^2 - f_2^2} = \rho_r^{G,S} + cdt_r - cdt^{G,S} + dTrop_r^{G,S} + b_{3,r} - b_3^{G,S} + \varepsilon_{3,r}^{G,S} \quad (6)$$

$$L_{3,r}^{G,S} = \frac{f_1^2 L_{1,r}^{G,S}}{f_1^2 - f_2^2} - \frac{f_2^2 L_{2,r}^{G,S}}{f_1^2 - f_2^2} = \rho_r^{G,S} + cdt_r - cdt^{G,S} + dTrop_r^{G,S} + \lambda_3 N_{3,r}^{G,S} + B_{3,r} - B_3^{G,S} + \delta_{3,r}^{G,S} \quad (7)$$

wherein $$b_{3,r} = \frac{f_1^2 b_{1,r}}{f_1^2 - f_2^2} - \frac{f_2^2 b_{2,r}}{f_1^2 - f_2^2}$$

$$b_3^{G,S} = \frac{f_1^2 b_1^{G,S}}{f_1^2 - f_2^2} - \frac{f_2^2 b_2^{G,S}}{f_1^2 - f_2^2}$$

$$B_{3,r} = \frac{f_1^2 B_{1,r}}{f_1^2 - f_2^2} - \frac{f_2^2 B_{2,r}}{f_1^2 - f_2^2}$$

$$B_3^{G,S} = \frac{f_1^2 B_1^{G,S}}{f_1^2 - f_2^2} - \frac{f_2^2 B_2^{G,S}}{f_1^2 - f_2^2}$$

$$\lambda_3 = \frac{c}{f_1 + f_2}$$

$$N_{3,r}^{G,S} = N_{1,r}^{G,S} + \frac{f_2}{f_1 - f_2}\left(N_{1,r}^{G,S} - N_{2,r}^{G,S}\right)$$

Because the pseudo-range hardware delay at the side of the receiver will be absorbed by the receiver clock bias, let $$c\hat{dt}_r = cdt_r + b_{3,r}$$

and the above equation becomes $$p_{3,r}^{G,S} = \rho_r^{G,S} + c\hat{dt}_r - cdt^{G,S} + dTrop_r^{G,S} + \varepsilon_{3,r}^{G,S} \quad (8)$$

$$L_{3,r}^{G,S} = \rho_r^{G,S} + c\hat{dt}_r - cdt^{G,S} + dTrop_r^{G,S} + \lambda_3 N_{3,r}^{G,S} - b_{3,r} + B_{3,r} - B_3^{G,S} + \delta_{3,r}^{G,S} \quad (9)$$

When the observation data of the multiple systems are processed in combination, the channel delay of the pseudo-range at the receiver side is absorbed by the clock bias parameter of the receiver and the channel delay is dependent on the signals, which therefore leads to that different systems correspond to different receiver clock biases $c\hat{dt}_r$, and then the observation equations corresponding to the LEO satellite and other satellite navigation systems can be rewritten as:

$$P_{3,r}^{L,S} = \rho_r^{L,S} + c\hat{dt}_r^L - cdt^{L,S} + dTrop_r^{L,S} - d_3^{L,S} + \varepsilon_{3,r}^{L,S} \quad (10)$$

$$L_{3,r}^{L,S} = \rho_r^{L,S} + c\hat{dt}_r^L - cdt^{L,S} + dTrop_r^{L,S} + \lambda_3 N_{3,r}^{L,S} - b_{3,r} + B_{3,r} - B_3^{L,S} + \delta_{3,r}^{L,S} \quad (11)$$

$$P_{3,r}^{G,S} = \rho_r^{G,S} + c\hat{dt}_r^G - cdt^{G,S} + dTrop_r^{G,S} - b_3^{G,S} + \varepsilon_{3,r}^{G,S} \quad (12)$$

$$P_{3,r}^{G,S} = \rho_r^{G,S} + c\hat{dt}_r^G - cdt^{G,S} + dTrop_r^{G,S} - b_3^{G,S} + \varepsilon_{3,r}^{G,S} \quad (12)$$

$$L_{3,r}^{G,S} = \rho_r^{G,S} + c\hat{dt}_r^G - cdt^{G,S} + dTrop_r^{G,S} + \lambda_3 N_{3,r}^{G,S} - b_{3,r} + B_{3,r} - B_3^{G,S} + \delta_{3,r}^{G,S} \quad (13)$$

in which $c\hat{dt}_r^L$ is the receiver clock bias corresponding to the LEO satellite, and $c\hat{dt}_r^G$ is the receiver clock bias corresponding to the respective navigation systems. The Frequency Division Multiple Access technology is used in the GLONASS, the receiver pseudo-range channel delays generated by the satellite signals of different frequencies are different, which results in not being completely absorbed by the receiver clock biases. However, if smaller weights are assigned to the GLONASS pseudo-range observation values, these channel delay differences can be approximately considered to be included in the residual errors. Therefore, these variables are no longer reflected in the observation model.

(3) Performing Error Correction by Using Navigation Satellite Augmentation Information Broadcasted by the LEO Satellites and the Model In the augmentation information broadcasted by the LEO satellites, a unified spatial coordinate reference is used in all of the precise satellite orbit products, and a unified time reference is used in the precise satellite clock bias products. Therefore, there is no problem of inconsistent coordinate reference or time reference in the observation model. At the same time, the precise satellite clock bias products are generated by using the observation value of ionosphere-free combinations, which include the pseudo-range channel delay at the satellite side.

In addition, tropospheric delay can usually be divided into two parts of dry component and wet component. The dry component can be corrected by the model, and the wet component is estimated as the parameters to be estimated. In order to reduce the number of parameters to be estimated, a mapping function can be used to project the oblique delay to the zenith direction, and only one zenith wet delay is estimated.

Let $$\lambda_3 \hat{N}_{3,r}^{G,S} = \lambda_3 N_{3,r}^{G,S} - (b_{3,r} - b_3^{L,S}) + (B_{3,r} - B_3^{G,S}) \quad (14)$$

By using the provided navigation satellite augmentation information, as well as the models such as relativistic effect, earth rotation, and antenna phase center, to correct the observation equations, to eliminate part of unknown parameters, and to ignore residual satellite orbits and clock bias errors, the corresponding observation equations of the LEO satellite and other satellite navigation systems become:

$$P_{3,r}^{L,S} = \rho_r^{L,S} + c\hat{dt}_r^L + M_r^{L,S} Z_r + \varepsilon_{3,r}^{L,S} \quad (15)$$

$$L_{3,r}^{L,S} = \rho_r^{L,S} + c\hat{dt}_r^L + M_r^{L,S} Z_r + \lambda_3 \hat{N}_{3,r}^{L,S} + \delta_{3,r}^{L,S} \quad (16)$$

$$P_{3,r}^{G,S} = \rho_r^{G,S} + c\hat{dt}_r^G + M_r^{G,S} Z_r + \varepsilon_{3,r}^{G,S} \quad (17)$$

$$L_{3,r}^{G,S} = \rho_r^{G,S} + c\hat{dt}_r^G + M_r^{G,S} Z_r + \lambda_3 \hat{N}_{3,r}^{G,S} + \delta_{3,r}^{G,S} \quad (18)$$

wherein $M_r^{L,S}$, $M_r^{G,S}$ respectively are the mapping functions corresponding to the LEO satellite and other satellite navigation systems, and $Z_r$ is the tropospheric zenith wet delay.

(4) Linearizing the Observation Equations

By performing Taylor expansion at the approximate position of the receiver, and discarding the second-order terms, the linearized observation equations are obtained as follows:

$$P_{3,r}^{L,S}=R_{r,0}^{L,S}-l\Delta x_r-m\Delta y_r-n\Delta z_r+c\hat{dt}_r^L+M_r^{L,S}Z_r+\varepsilon_{3,r}^{L,S} \quad (19)$$

$$L_{3,r}^{L,S}=R_{r,0}^{L,S}-l\Delta x_r-m\Delta y_r-n\Delta z_r+c\hat{dt}_r^L+M_r^{L,S}Z_r+\lambda_3\hat{N}_{3,r}^{L,S}+\delta_{3,r}^{L,S} \quad (20)$$

$$P_{3,r}^{G,S}=R_{r,0}^{L,S}-l\Delta x_r-m\Delta y_r-n\Delta z_r+c\hat{dt}_r^G+M_r^{G,S}Z_r+\varepsilon_{3,r}^{G,S} \quad (21)$$

$$L_{3,r}^{G,S}=R_{r,0}^{L,S}-l\Delta x_r-m\Delta y_r-n\Delta z_r+c\hat{dt}_r^G+M_r^{G,S}Z_r+\lambda_3\hat{N}_{3,r}^{G,S}+\delta_{3,r}^{G,S} \quad (22)$$

in which $$l = \frac{(x^s - x_{r,0})}{\sqrt{(x^s - x_{r,0})^2 + (y^s - y_{r,0})^2 + (z^s - z_{r,0})^2}}$$

$$m = \frac{(y^s - y_{r,0})}{\sqrt{(x^s - x_{r,0})^2 + (y^s - y_{r,0})^2 + (z^s - z_{r,0})^2}}$$

$$n = \frac{(z^s - z_{r,0})}{\sqrt{(x^s - x_{r,0})^2 + (y^s - y_{r,0})^2 + (z^s - z_{r,0})^2}}$$

$(x^s,y^s,z^s)$ are the coordinates of the LEO satellite and navigation satellite precision orbit, and $(x_{r,0},y_{r,0},z_{r,0})$ are the approximate position of the receiver. And then the observation equations can be simplified as:

$$V=A\Delta X+L \quad (23)$$

in which V is the observation residual error, A is the coefficient matrix, $\Delta X$ is the unknown vector including receiver coordinate correction, receiver clock bias, tropospheric zenith wet delay, carrier phase ambiguity, L is the calculation vector.

(5) Performing Parameter Estimation and Ambiguity Fixation Processing

Kalman filtering is used for comprehensive PPP processing. In the filtering, it is necessary to provide a suitable observation value random model and a state vector dynamic model. A random model describes the statistical characteristics of the observation values, and is usually represented by the variance-covariance matrix of the observation values. It can be known from the observation equations that the observation values of ionosphere-free combination are a linear combination of the original observation values. Assuming that the observation values at different frequencies are uncorrelated, the initial variance of the observation values of ionosphere-free combination can be calculated by the law of error propagation. The specific variance can be defined as a function of the initial variance and the satellite altitude angle. Assuming that the observation values of different satellites and different systems are uncorrelated, and that the observation values of different types, that is, the pseudo-range and phase observation values, are uncorrelated, the variance-covariance matrix of the observation values can be obtained.

For the dynamic model of the state vector, the static receiver coordinates can be represented as constants, and the dynamic receiver coordinates can be represented as random walks or first-order Gaussian-Markov processes, and the tropospheric zenith wet delay can be represented as random walk processes, the carrier phase ambiguity parameter can be represented as a constant, and then the state equation is obtained:

$$X_k=\Phi(t_k,t_{k-1})X_{k-1}+w_{k-1} \quad (24)$$

wherein, X is the parameter such as receiver coordinate correction to be estimated, receiver clock bias and the like, $\Phi$ is the state transition matrix, and $w_{k-1}$ is the state transition noise. By integrating the observation equations and the state equation, the standard Kalman filtering process can be used for parameter estimation. Here, since the satellite fractional phase bias correction is not performed, only the carrier phase ambiguity-float solution result is obtained. If the satellite fractional phase bias contained in the LEO satellite augmentation information is further used to correct the observation equations, the integer characteristic of the ambiguity can be restored, the ambiguity fixation can be realized, and the carrier phase ambiguity-fixed solution result can be obtained, which further shortens the time for initialization and improves the accuracy of positioning, velocity measurement and timing.

Due to the addition of the observation data of the navigation direct signals of the LEO constellation, observation geometry for the user is greatly improved by the fast-moving characteristics of the low-orbit satellites, thereby greatly reducing the time for PPP initialization.

The main procedure of the PPP-RTK processing augmented based on LEO constellation navigation in the ground-based augmented region is:

In the ground-based augmented region, all reference stations will be divided into several triangular subnets using the Delaunay method, and the comprehensive error correction information of each visible satellite will be constructed for each subnet according to the network RTK method based on undifferenced correction numbers, respectively, in which the ionosphere and troposphere in the direction of each satellite, and satellite-related channel delays, satellite clock biases, and satellite orbit errors are included, which are represented as:

$$omc_{P_{i,r}}^{G,S} = -cdt^{G,S} - dOrb_r^{G,S} + dTrop_r^{G,S} + \frac{f_1^2}{f_i^2}dIon_r^{G,S} - b_i^{G,S} \quad (25)$$

$$omc_{L_{i,r}}^{G,S} = -cdt^{G,S} - dOrb_r^{G,S} + dTrop_r^{G,S} - \frac{f_1^2}{f_i^2}dIon_r^{G,S} - B_3^{G,S} \quad (26)$$

$omc_{P_{i,r}}^{G,S}$, $omc_{L_{i,r}}^{G,S}$ respectively denote the pseudo-range and carrier phase comprehensive error correction information.

Plane fitting modeling is performed by the receiver on the comprehensive error correction information of at least 3 ground-based augmentation stations at the periphery according to the approximate position, and the pseudo-range and carrier phase observation values of the user are refined by using the local error correction information obtained by interpolation. After correction, the corresponding observation equations of the LEO satellites and other satellite navigation systems can be written as:

$$P_{3,r}^{L,S}=\rho_r^{L,S}+c\hat{dt}_r^L+\varepsilon_{3,r}^{L,S} \quad (27)$$

$$L_{3,r}^{L,S}=\rho_r^{L,S}+c\hat{dt}_r^L+\lambda_3 N_{3,r}^{L,S}-b_{3,r}+B_{3,r}+\delta_{3,r}^{L,S} \quad (28)$$

$$P_{3,r}^{G,S}=\rho_r^{G,S}+c\hat{dt}_r^G+\varepsilon_{3,r}^{G,S} \quad (29)$$

$$L_{3,r}^{G,S}=\rho_r^{G,S}+c\hat{dt}_r^G+\lambda_3 N_{3,r}^{G,S}-b_{3,r}+B_{3,r}+\delta_{3,r}^{G,S} \quad (30)$$

The unknown variables in the equations at this time include receiver position coordinates, receiver clock biases, receiver channel delays and carrier phase ambiguity parameters. The receiver clock biases and the channel delays can be further eliminated by using the single difference between satellites. And then receiver position estimation and carrier phase ambiguity fixation can be performed by using linearization processing strategy and parameter estimation method introduced above.

Due to the addition of the observation data of the navigation direct signals of the LEO constellation, observation geometry for the user is greatly improved by the fast-moving characteristics of the LEO satellites, so that under the same initialization time and positioning accuracy requirements, the station density of the ground augmented monitoring network can be greatly reduced, thereby reducing the construction cost of the monitoring network.

The LEO constellation augmented fast velocity measurement, calculation process of timing for global region and ground-based augmented region is similar to the positioning process, and will not be repeated here.

In the PPP-RTK positioning method provided by the embodiment of the present application, navigation direct signals are broadcasted through LEO satellites, geometric configurations of user observation space are comprehensively improved by using the fast-moving characteristics of the LEO satellites, and the time for initialization of the PPP of the user can be shortened to quasi real-time. In the ground-based augmented region, the time for initialization is further shortened to real-time by correcting the user observation errors with further receiving the comprehensive error information of the current region, and adopting the calculation processing mode unified with the PPP. Through this method, the station density of the ground augmented monitoring network can be effectively reduced and the seamless switching of multi-system PPP and RTK services augmented by LEO constellation can be realized through a unified model.

Figure 4:
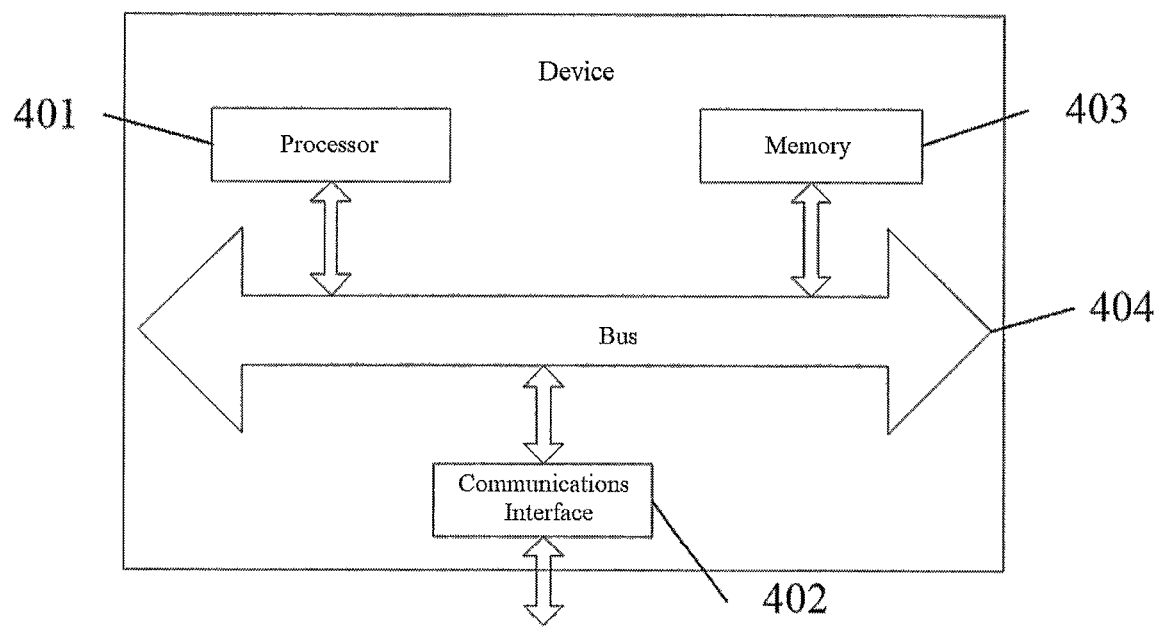
FIG. 4 shows a structural block diagram of a device provided by an embodiment of the present application.

FIG. 4 is a structural block diagram of an electronic device provided by the present embodiment. The device provided by the present embodiment may include a processor 401 and a memory 403, and may also include a communications interface 402 and a bus 404. Wherein the processor 401, the communication interface 402, and the memory 403 can communicate with each other through the bus 404. The communication interface 402 can be used for information transmission. The processor 801 may call logic instructions in the memory 403 to execute the positioning method of Precise Point Positioning-Real Time Kinematic PPP-RTK of the forgoing embodiment, including: determining original observation data when a direct signal broadcasted by a multi-system navigation satellite and a LEO constellation is detected; receiving navigation satellite augmentation information broadcasted by the LEO constellation, as well as a LEO satellite precision orbit and a precision clock bias; performing Precise Point Positioning by using the navigation satellite augmentation information, the LEO satellite precision orbit and the precision clock bias, and the original observation data; or when the ground based augmentation comprehensive error correction information is received, performing ground based augmented Precise Point Positioning by using the navigation satellite augmentation information, the LEO satellite precision orbit and the precision clock bias, the original observation data and ground based augmentation comprehensive error correction information.

The embodiment of the present application also provides a non-volatile storage medium, which includes a stored program, wherein the method provided by the foregoing embodiment is executed when the program is running, and the method includes:

determining original observation data when a direct signal broadcasted by a multi-system navigation satellite and a LEO constellation is detected; receiving navigation satellite augmentation information broadcasted by the LEO constellation, as well as a LEO satellite precision orbit and a precision clock bias; performing Precise Point Positioning by using the navigation satellite augmentation information, the LEO satellite precision orbit and the precision clock bias, and the original observation data; or when the ground based augmentation comprehensive error correction information is received, performing ground based augmented Precise Point Positioning by using the navigation satellite augmentation information, the LEO satellite precision orbit and the precision clock bias, the original observation data and ground based augmentation comprehensive error correction information.

The present application also provides a processor, which is configured to run a program, wherein the program is configured to execute the method provided by the foregoing embodiment on the processor, and the method includes:

determining original observation data when a direct signal broadcasted by a multi-system navigation satellite and a LEO constellation is detected; receiving navigation satellite augmentation information broadcasted by the LEO constellation, as well as a LEO satellite precision orbit and a precision clock bias; performing Precise Point Positioning by using the navigation satellite augmentation information, the LEO satellite precision orbit and the precision clock bias, and the original observation data; or when the ground based augmentation comprehensive error correction information is received, performing ground based augmented Precise Point Positioning by using the navigation satellite augmentation information, the LEO satellite precision orbit and the precision clock bias, the original observation data and ground based augmentation comprehensive error correction information.

Through the above description of the embodiments, those skilled in the art can clearly understand that multiple embodiments can be implemented by means of software plus a necessary general hardware platform, and of course, they can also be implemented by hardware. Based on such understanding, the above technical solution essentially or the part of the above technical solution that contributes to the related technology can be embodied in the form of a software product. The computer software product can be stored in a computer-readable storage medium, such as a Read-Only Memory (ROM)/Random Access Memory (RAM), magnetic disks, optical disks, etc., including several instructions to make a computer device (which may be a personal computer, server, or network device, etc.) execute multiple embodiments or methods described in some parts of the embodiments.

In addition, those skilled in the art can understand that, although some embodiments herein include certain features included in other embodiments but not other features, the combination of features of different embodiments means that they are within the scope of the present application and form different embodiments. For example, in the following claims, any one of the claimed embodiments can be used in any combination.

The invention claimed is:

1. A positioning method of Precise Point Positioning-Real Time Kinematic PPP-RTK, comprising:

determining original observation data when a direct signal broadcasted by a multi-system navigation satellite and a Low Earth Orbit (LEO) constellation is detected via a receiver in a navigation apparatus, wherein the navigation apparatus is arranged at a user equipment;

receiving by the receiver navigation satellite augmentation information broadcasted by the LEO constellation, as well as an LEO satellite precision orbit and a precision clock bias;

performing Precise Point Positioning of the user equipment by the navigation apparatus using the navigation satellite augmentation information, the LEO satellite precision orbit and the precision clock bias, and the original observation data; or when ground based augmentation comprehensive error correction information is received, performing ground based augmented Precise Point Positioning of the user equipment by the navigation apparatus using the navigation satellite augmentation information, the LEO satellite precision orbit and the precision clock bias, the original observation data and ground based augmentation comprehensive error correction information.

2. The method as claimed in claim 1, wherein the determining original observation data when a direct signal broadcasted by a multi-system navigation satellite and a Low Earth Orbit (LEO) constellation is detected via a receiver in a navigation apparatus comprises:

tracking the direct signal and determining time length for tracking when the direct signal broadcasted by the multi-system navigation satellite and the LEO constellation is detected; and measuring the direct signal to determine the original observation data when the time length for tracking is larger than a preset time length.

3. The method as claimed in claim 1, wherein the multi-system navigation satellite comprises at least one of the following:

US Global Positioning System GPS, China Beidou, EU Galileo, Russian Global Navigation Satellite System GLONASS.

4. The method as claimed in claim 1, wherein the navigation satellite augmentation information comprises at least one of the following:

a navigation satellite precision orbit and clock bias, a navigation satellite fractional phase bias correction, a LEO satellite fractional phase bias correction, and ionospheric model parameter information.

5. The method as claimed in claim 1, wherein the original observation data comprises at least one of the following:

navigation satellite and LEO satellite pseudo-range observation data, navigation satellite and LEO satellite carrier phase observation data, and navigation satellite and LEO satellite Doppler observation data.

6. The method as claimed in claim 1, wherein a processing mode for the Precise Point Positioning comprises at least one of the following:

a LEO satellite augmented ambiguity-float solution mode and a LEO satellite augmented ambiguity-fixed solution mode.

7. The method as claimed in claim 1, wherein the ground based augmentation comprehensive error correction information comprises at least one of the following:

an undifferenced pseudo-range observation comprehensive error and an undifferenced carrier phase observation comprehensive error.

8. The method as claimed in claim 2, wherein the original observation data comprises at least one of the following:

navigation satellite and LEO satellite pseudo-range observation data, navigation satellite and LEO satellite carrier phase observation data, and navigation satellite and LEO satellite Doppler observation data.

9. The method as claimed in claim 7, wherein the ground based augmentation comprehensive error correction information further comprises:

ionosphere delays and troposphere delays in a direction of each satellite, and satellite-related channel delays, satellite clock biases, and satellite orbit errors.

10. An electronic device, comprising:

at least one processor; and a memory in communication with the at least one processor;

wherein the memory stores executable instructions that upon execution cause the at least one processor to perform operations, the operations comprising:

determining original observation data when a direct signal broadcasted by a multi-system navigation satellite and a Low Earth Orbit (LEO) constellation is detected via a receiver in a navigation apparatus, wherein the navigation apparatus is arranged at a user equipment;

receiving by the receiver navigation satellite augmentation information broadcasted by the LEO constellation, as well as an LEO satellite precision orbit and a precision clock bias;

performing Precise Point Positioning of the user equipment by the navigation apparatus using the navigation satellite augmentation information, the LEO satellite precision orbit and the precision clock bias, and the original observation data; or when ground based augmentation comprehensive error correction information is received, performing ground based augmented Precise Point Positioning of the user equipment by the navigation apparatus using the navigation satellite augmentation information, the LEO satellite precision orbit and the precision clock bias, the original observation data and ground based augmentation comprehensive error correction information.

11. The electronic device as claimed in claim 10, wherein the determining original observation data when a direct signal broadcasted by a multi-system navigation satellite and a Low Earth Orbit (LEO) constellation is detected via a receiver in a navigation apparatus comprises:

tracking the direct signal and determining time length for tracking when the direct signal broadcasted by the multi-system navigation satellite and the LEO constellation is detected; and measuring the direct signal to determine the original observation data when the time length for tracking is larger than a preset time length.

12. The electronic device as claimed in claim 10, wherein the multi-system navigation satellite comprises at least one of the following:

US Global Positioning System GPS, China Beidou, EU Galileo, Russian Global Navigation Satellite System GLONASS.

13. The electronic device as claimed in claim 10, wherein the navigation satellite augmentation information comprises at least one of the following:
   a navigation satellite precision orbit and clock bias, a navigation satellite fractional phase bias correction, a LEO satellite fractional phase bias correction, and ionospheric model parameter information.

14. The electronic device as claimed in claim 10, wherein the original observation data comprises at least one of the following:
   navigation satellite and LEO satellite pseudo-range observation data, navigation satellite and LEO satellite carrier phase observation data, and navigation satellite and LEO satellite Doppler observation data.

15. The electronic device as claimed in claim 10, wherein a processing mode for the Precise Point Positioning comprises at least one of the following:
   a LEO satellite augmented ambiguity-float solution mode and a LEO satellite augmented ambiguity-fixed solution mode.

16. The electronic device as claimed in claim 10, wherein the ground based augmentation comprehensive error correction information comprises at least one of the following: an undifferenced pseudo-range observation comprehensive error and an undifferenced carrier phase observation comprehensive error.

17. The electronic device as claimed in claim 11, wherein the original observation data comprises at least one of the following:
   navigation satellite and LEO satellite pseudo-range observation data, navigation satellite and LEO satellite carrier phase observation data, and navigation satellite and LEO satellite Doppler observation data.

18. The electronic device as claimed in claim 16, wherein the ground based augmentation comprehensive error correction information further compromises:
   ionosphere delays and troposphere delays in a direction of each satellite, and satellite-related channel delays, satellite clock biases, and satellite orbit errors.

19. A non-volatile computer readable storage medium storing at least one executable instruction, wherein the executable instruction is configured to cause a processor to perform operations of:
   determining original observation data when a direct signal broadcasted by a multi-system navigation satellite and a Low Earth Orbit (LEO) constellation is detected via a receiver in a navigation apparatus, wherein the navigation apparatus is arranged at a user equipment;
   receiving by the receiver navigation satellite augmentation information broadcasted by the LEO constellation, as well as an LEO satellite precision orbit and a precision clock bias;
   performing Precise Point Positioning of the user equipment by the navigation apparatus using the navigation satellite augmentation information, the LEO satellite precision orbit and the precision clock bias, and the original observation data; or
   when ground based augmentation comprehensive error correction information is received, performing ground based augmented Precise Point Positioning of the user equipment by the navigation apparatus using the navigation satellite augmentation information, the LEO satellite precision orbit and the precision clock bias, the original observation data and ground based augmentation comprehensive error correction information.

\* \* \* \* \*